(12) United States Patent
Lee et al.

(10) Patent No.: US 6,600,543 B1
(45) Date of Patent: Jul. 29, 2003

(54) LIQUID CRYSTAL DISPLAY DEVICE AND METHOD OF MANUFACTURING SAME

(75) Inventors: Gun Hee Lee, Kumi-shi (KR); Woo Nam Jeong, Kumi-shi (KR); Kwang Sup Park, Kumi-shi (KR); Ki Tae Kim, Kumi-shi (KR); Dong Yeung Kwak, Daeku-shi (KR)

(73) Assignee: LG, Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/521,792

(22) Filed: Mar. 9, 2000

(30) Foreign Application Priority Data

May 21, 1999 (KR) ............................................... 99-18569

(51) Int. Cl.[7] ........................................... G02F 1/1345
(52) U.S. Cl. ....................................... 349/149; 349/152
(58) Field of Search ........................... 349/149, 42, 43, 349/152

(56) References Cited

U.S. PATENT DOCUMENTS

| | | | |
|---|---|---|---|
| 5,510,918 A | 4/1996 | Matsunaga et al. | 349/42 |
| 5,581,382 A | 12/1996 | Kim | 349/42 |
| 5,731,856 A | 3/1998 | Kim et al. | 349/43 |
| 5,798,812 A | 8/1998 | Nishiki et al. | |
| 5,818,562 A | 10/1998 | Yoon | 349/149 |
| 5,825,449 A * | 10/1998 | Shin | 349/148 |
| 6,043,511 A * | 3/2000 | Kim | 257/59 |
| 6,064,358 A * | 5/2000 | Kitajima et al. | 345/88 |
| 6,172,721 B1 * | 1/2001 | Murade et al. | 349/43 |
| 6,208,404 B1 * | 3/2001 | Tomoyori et al. | 349/187 |

* cited by examiner

*Primary Examiner*—Toan Ton
*Assistant Examiner*—Dung Nguyen

(57) ABSTRACT

A liquid crystal display (LCD) device has improved adhesion between a tape carrier package and a liquid crystal panel and the LCD device includes an organic insulating layer for increasing the aperture ratio. The LCD includes electrode pads provided on a substrate, semiconductor patterns for preventing etching of the portions of the gate insulating layer that are in contact with the electrode pads, and transparent electrodes for protecting the electrode pads and in contact with the semiconductor patterns. The LCD eliminates the organic protective layer positioned around the pads, thereby strengthening the adhesion between the liquid crystal panel and the TCP.

36 Claims, 9 Drawing Sheets

LIQUID CRYSTAL DISPLAY DEVICE AND METHOD OF MANUFACTURING SAME

This application claims the benefit of Korean Patent Application No. P99-18569, filed on May 21, 1999, which is hereby incorporated by reference.

BACKGROUND OF THE INVENTION

1. Field of the Invention

This invention relates to a liquid crystal display (LCD) and more particularly, to an LCD that has stronger adhesion between a tape carrier package (TCP) and an LCD panel having an organic insulating layer, and a method for manufacturing the same.

2. Description of the Related Art

Generally, an LCD controls the light transmissivity of liquid crystal cells in response to a video signal, thereby displaying a picture that reflects the video signal that is transmitted to the liquid crystal panel in which liquid crystal cells are arranged in a matrix pattern. To achieve this result, the LCD includes drive integrated circuits (ICs) for driving the liquid crystal cells that are arranged in the matrix pattern on the liquid crystal panel. The drive ICs are manufactured in chip form. The drive IC chips are loaded onto the TCP when the LCD is implemented in a Tape Automated Bonding (TAB) system. Alternatively, if the LCD is implemented in a Chips On Glass (COG) system, the drive IC chips are mounted on the liquid crystal panel. The drive IC chips that are implemented in the COG system are electrically connected to a pad portion on the liquid crystal panel by the TCP.

FIG. 1 shows a surface of a conventional liquid crystal panel. The liquid crystal panel 2 has a structure that includes a lower substrate 4 and an upper too, substrate 6, which are bonded so as to oppose each other. The liquid crystal panel 2 also includes a display portion 8 that is provided with liquid crystal cells arranged in a matrix, and a gate pad portion 12 and a data pad portion 14 arranged such that each is connected between the drive IC chips (not shown) and the display portion 8. The display portion 8 includes gate lines and data lines arranged on the lower substrate 4 such that they intersect each other, thin film transistors for switching the liquid crystal cells located at the intersections of the gate and data lines, and pixel electrodes that are each connected to the thin film transistors for driving the liquid crystal cells. Also, the display portion 8 has color filters separated by a black matrix on the upper substrate 6 that are the size of a cell region, and a transparent common electrode coated on the surface of the color filters. The lower substrate 4 and the upper substrate 6 are separated from each other by spacers to define a cell gap so that the cell gap. can be filled with liquid crystal material. Also, the lower substrate 4 and the upper substrate 6 are bonded to each other by a sealing material 10 that surrounds the display portion 8. The gate pad portion 12 and the data pad portion 14 are provided at the edges of the lower substrate 4 which are not overlapped with the upper substrate 6. The gate pad portion 12 applies a gate driving signal from the gate drive IC chips, which are included in the drive IC chips, to the gate lines of the display portion 8. The data pad portion 14 transmits a video signal from the data drive IC chips, which are included in the drive IC chips, to the data lines of the display portion 8.

The liquid crystal panel 2 having the above-described structure uses a protective layer which is disposed on the entire surface of the lower substrate 4 to protect the pixel electrodes and the thin film transistors. The conventional protective layer is an inorganic layer made from SiNx, SiOx and other similar materials. In order to minimize the coupling effect caused by parasitic capacitance, the pixel electrodes and the data lines that are opposite each other have the inorganic protective layer as their center, and must be apart from each other by a constant distance, for example, about 3 to 5 μm. This is required because the inorganic protective layer has a high dielectric constant. Due to this, the pixel electrode, which determines the aperture ratio, must be small in size.

Conventionally, to make the pixel electrode bigger so that the aperture ratio is greater, an organic material such as benzocyclobutene (BCB), which has a low dielectric constant, is used as the protective layer. For exarmple, in U.S. Pat. No. 5,798,812, there is provided an organic insulating film that covers the pixel area. and the pad area portions of the LCD. Because the organic protective layer has a dielectric constant lower than that of the inorganic protective layer by about 2.7, the pixel electrode can be overlapped with the data line. Thus, the pixel electrode can be enlarged by the amount of overlap between the pixel electrode and the data line so that the aperture ratio of the liquid crystal cell is increased.

The LCD of the TAB system allows the TCP that mounts the drive IC chips to contact the gate and data pad portions. The TAB process forces the TCP to be repeatedly bonded to and then separated from the data and gate pad portions of the liquid crystal panel. In order to prevent the metallic electrodes that are used as the data pads from being damaged due to the repeated bonding and separation between the TCP and the data pad portion of the liquid crystal panel, the data pads that are included in the data pad portion and defined by metallic electrodes are connected to the TCP via transparent electrodes. However, the organic protective layer is weakly bonded with the gate insulating layer and therefore separates easily from the gate insulating layer. As a result, the transparent electrode on the organic protective layer is also easily separated. This problem will be described hereinbelow with reference to FIGS. 2 to 5B.

FIG. 2 is a detailed view of a part of the gate pad portion 12 of FIG. 1. FIG. 3A is a cross-sectional view representing the gate pad portion taken along the IIIA–IIIA' line as shown in FIG. 2. FIG. 3B is a cross-sectional view of the gate pad portion 12 taken along the IIIB–IIIB' line as shown in FIG. 2. Referring to FIGS. 2, 3A and 3B, the gate pads 16 are provided on a lower glass substrate 22 together with the gate lines that are included in the display portion all at the same time. A gate insulating layer 24 and an organic protective layer 26 are sequentially disposed on the entire surface of the lower glass substrate 22 having the gate pads 16 thereon. The gate insulating layer 24 and the organic protective layer 26 are patterned so as to form holes 18 at each of the gate pads 16. The holes 18 that are located at each gate pad 16 allow the gate pads 16 to be exposed. Transparent electrode patterns 20 are then formed on the organic protective layer 26 such that the transparent electrode patterns 20 are each connected to the corresponding gate pad 16 through the corresponding hole 18.

Note that the organic protective layer 26 is weakly bonded with the gate insulating layer 24 and so is separated easily from the gate insulating layer 24 when the TCP is separated from the gate pad portion 12 on the liquid crystal panel. Also, the adhesion between the organic protective layer 26 and the gate insulating layer 24 is further weakened by the holes 18 that are defined in the organic protective layer 26 and the gate insulating layer 24 so that almost all of the organic protective layer 26 becomes separated when the TCP is separated from the gate pad portion 12.

Therefore, the gate pad portion 12 does not have a uniform surface due to the separation of the organic protective layer 26. Because of this, the TCP becomes weakly bonded with the gate pad portion 12 when it is re-bonded with the gate pad portion 12 so as to decrease the connection area causing increased resistance. Further, the transparent electrode 20 is also separated from the gate pad portion 12 when the organic protective layer 26 becomes separated and exposes the gate pads 16. Thus, the gate pads 16 are easily damaged or oxidized.

FIG. 4 is a detail view of a part of the data pad portion 14 of FIG. 1. FIG. 5A is a cross-sectional view representing the data pad portion 14 taken along the VA–VA' line of FIG. 4, and FIG. 5B is a cross-sectional view of the data pad portion 14 taken along the VB–VB' line of FIG. 4. Data pads 28, as shown in FIGS. 4, 5A and 5B, are provided on the gate insulating layer 24 of a lower glass substrate 22 together with the data lines (not shown) all at the same time. A semiconductor layer 30 under the data pad 28 is extended to the data line. The organic protective layer 26 is disposed on the entire surface of the gate insulating layer 24 having the data pads thereon. The organic protective layer 26 is patterned so as to define holes 18 at each of the data pads 28. The holes 18 defined at each of the data pads 28 allow the data pads 28 to be exposed. Transparent electrode patterns 20 are defined on the organic protective layer 26 such that the electrode patterns 20 are each connected to the corresponding data pad 28 through the corresponding hole 18.

Note that the organic protective layer 26 is weakly bonded with the gate insulating layer 24 and therefore separates easily from the gate insulating layer 24 when the TCP is separated from the data pad portion 14 on the liquid crystal panel. Also, the adhesion between the organic protective layer 26 and gate insulating layer 24 is further weakened by the holes 18 that are defined on the organic protective layer 26 so that almost all of organic protective layer 26 becomes removed during this process.

Therefore, the data pad portion 14 has a surface that is non-uniform due to the separation of the organic protective layer 26. Because of this, the TCP becomes weakly bonded with the data pad portion 14 when it is re-bonded with the data pad portion 14 so as to decrease the connection area causing increased resistance. Further, the transparent electrode 20 is also separated from the data pad portion 14 along with the organic protective layer 26 so that the data pads 28 become exposed. Thus, the data pads 28 are easily damaged or oxidized.

SUMMARY OF THE INVENTION

To overcome the problems described above, preferred embodiments of the present invention provide an LCD that has stronger adhesion between the TCP and a liquid crystal panel while providing a high aperture ratio by using an organic insulating layer.

A preferred embodiment of the present invention includes a substrate, electrode pads on the substrate, transparent electrodes arranged on the electrode pads, and a semiconductor layer disposed between the substrate and the transparent electrodes, wherein the semiconductor layer is in contact with the transparent electrodes.

Another preferred embodiment of the present invention includes a glass substrate, a gate insulating layer on the glass substrate, electrode pads on the glass substrate, transparent electrodes on the electrode pads for protecting the electrode pads, a semiconductor layer on the gate insulating layer for preventing an etching of a gate insulating layer that is in contact with the electrode pads, and wherein the semiconductor layer is in contact with the transparent electrodes.

According to another preferred embodiment of the present invention a method for manufacturing an LCD includes the steps of providing a glass substrate, forming gate pads on the glass substrate, overlaying a gate insulating layer on the entire surface of the glass substrate and forming holes exposing the gate pads, forming data pads on the gate insulating layer, disposing a semiconductor layer on the gate insulating layer, wherein the semiconductor layer is at least partially beneath the data pads, and wherein the semiconductor layer is at least partially overlapped with the the gate pads, coating an organic protective layer on the entire surface of the glass substrate, sequentially etching the organic protective layer and the gate insulating layer in an area of the gate pads and the data pads, wherein the organic protective layer is removed from the area of the gate and data pads, and forming transparent electrodes on the data and gate pads for protecting the data and gate pads.

Thus, the present invention described herein makes possible the advantages of having stronger adhesion between the TCP and the pad portions of a liquid crystal panel while improving the aperture ratio of the LCD.

Other features, elements and advantages will be described in detail below with reference to preferred embodiments of the present invention and the attached drawings.

BRIEF DESCRIPTION OF THE ATTACHED DRAWINGS

The present invention will become more fully understood from the detailed description given herein below and the accompanying drawings which are given by way of illustration only, and thus do not limit the present invention and wherein.

DETAILED DESCRIPTION OF PREFERRED EMBODIMENTS

Preferred embodiments of the present invention for strengthening the adhesion between a TCP and pad portions of a liquid crystal panel will be described in detail with reference to FIGS. 6 to 9B.

Figure 1:
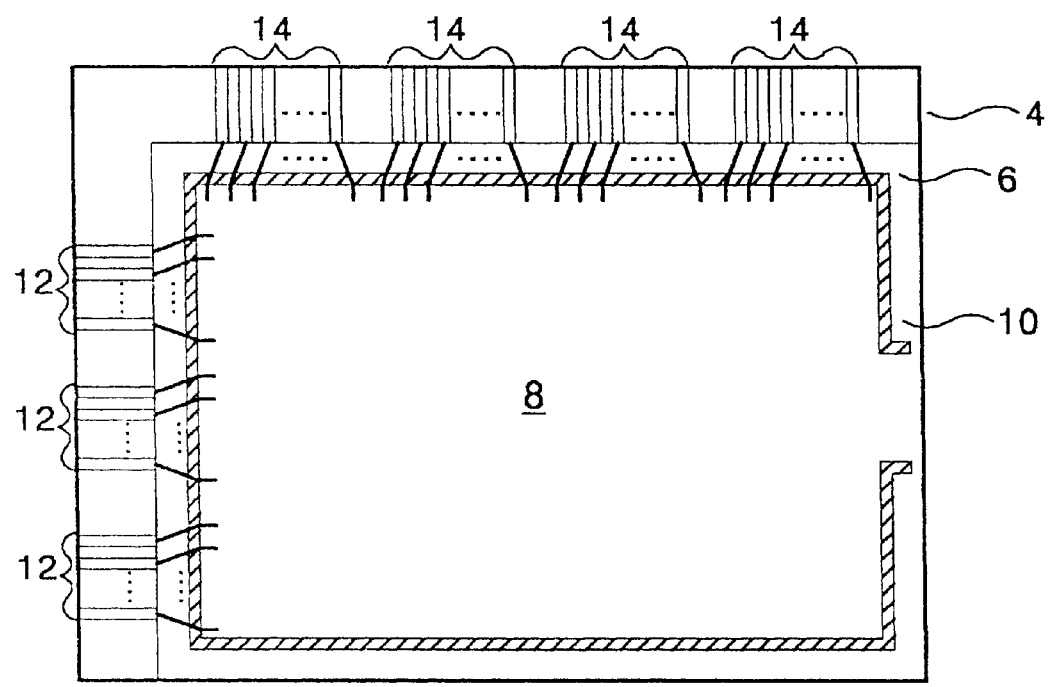
FIG. 1 is a plan view of a conventional LCD.
Figure 2:
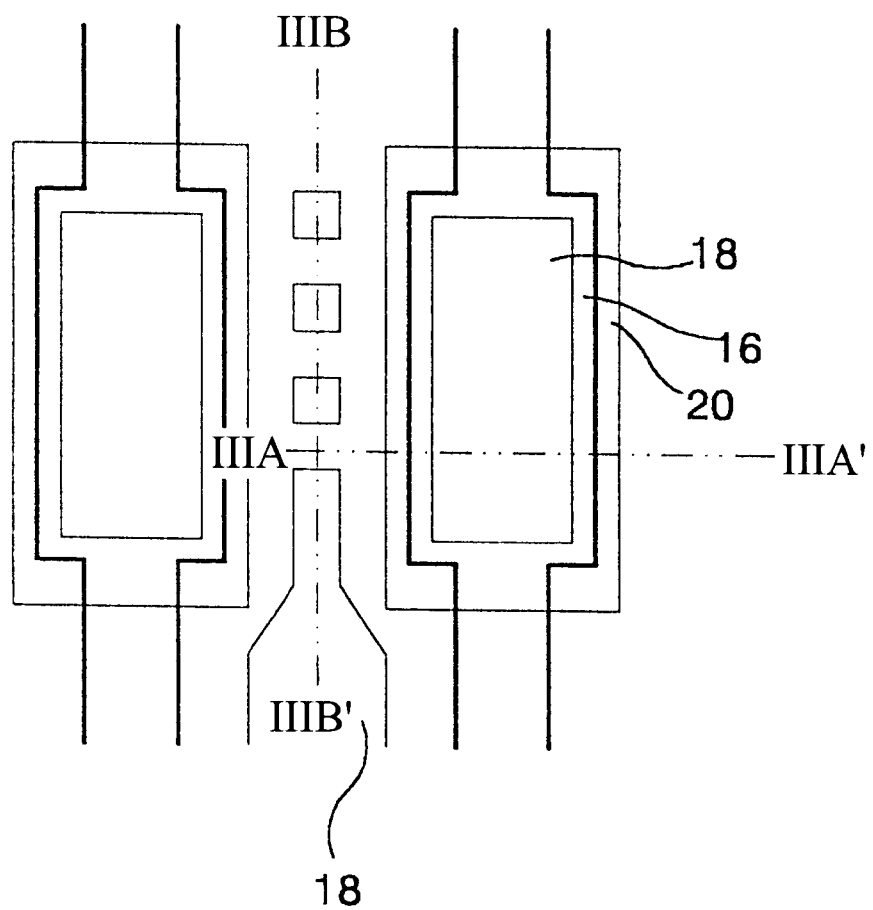
FIG. 2 is a plan view representing in detail a part of the gate pad portion as shown in FIG. 1.
Figure 3A:
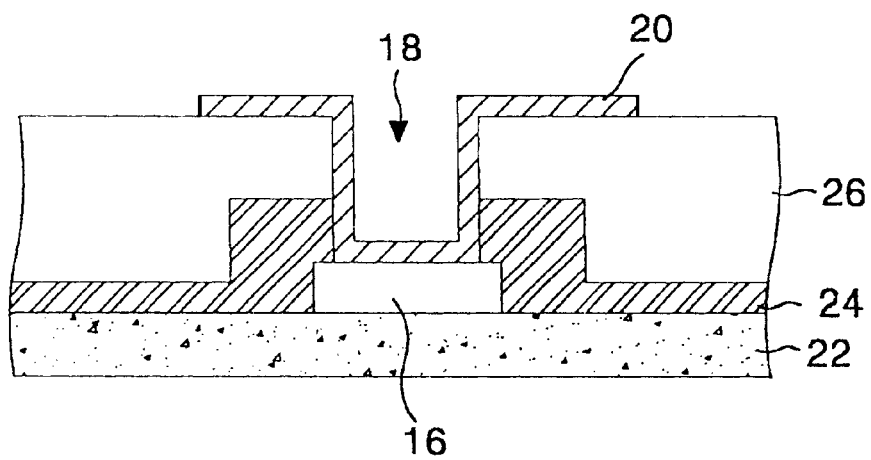
FIG. 3A is a cross-sectional view showing the gate pad portion taken along the IIIA–IIIA' line of FIG. 2.
Figure 3B:
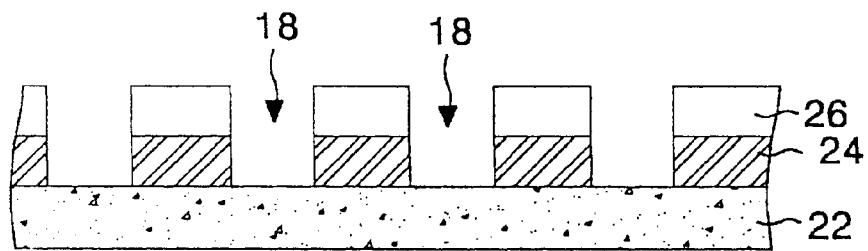
FIG. 3B is a cross-sectional view showing the gate pad portion taken along the IIIB–IIIB' line of FIG. 2.
Figure 4:
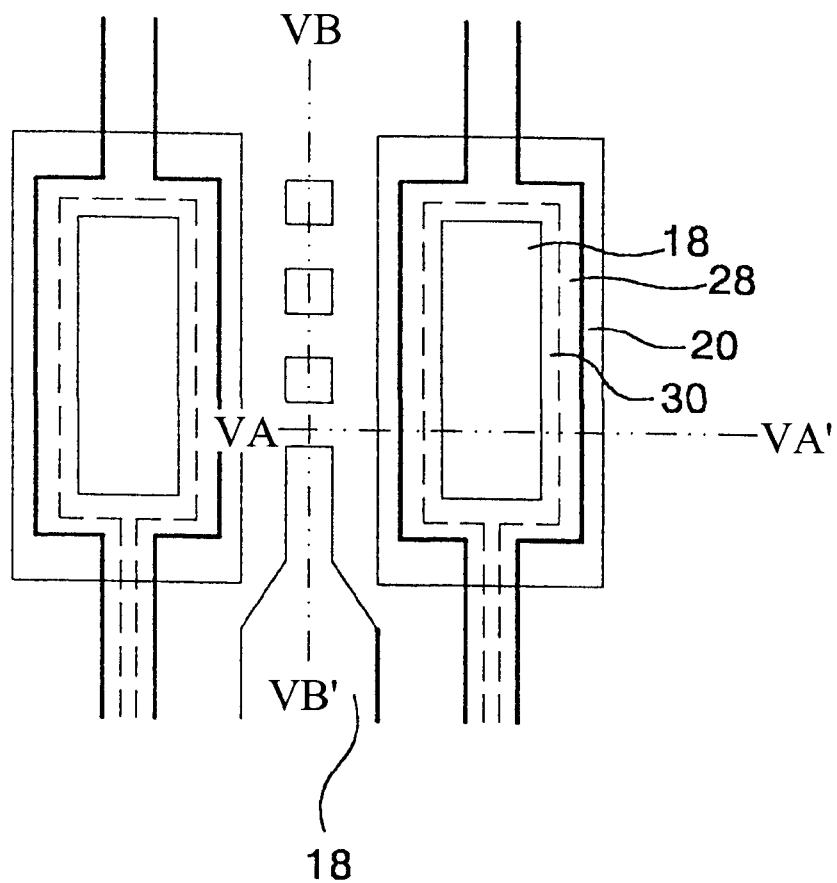
FIG. 4 is a plan view representing in detail a part of the data pad portion as shown in FIG. 1.
Figure 5A:
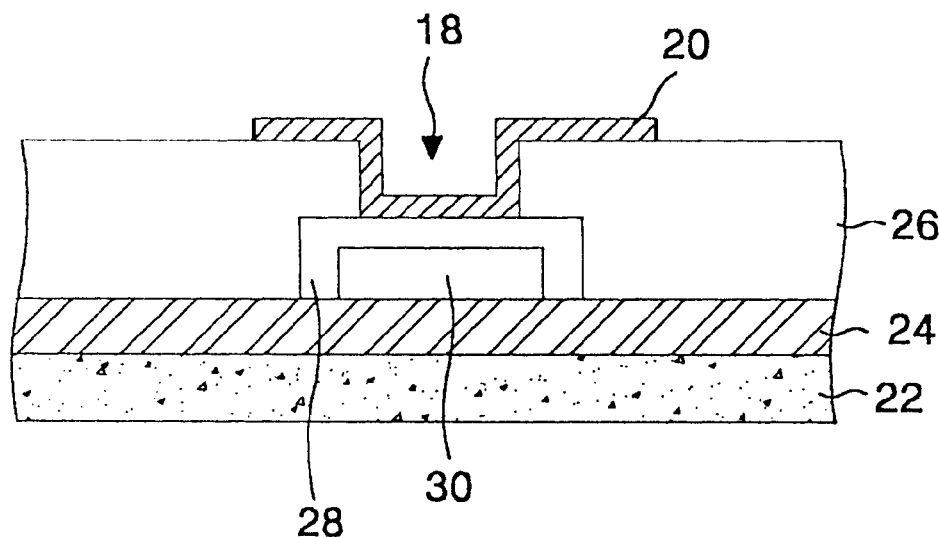
FIG. 5A is a cross-sectional view showing the data pad portion taken along the VA–VA' line of FIG. 4.
Figure 5B:
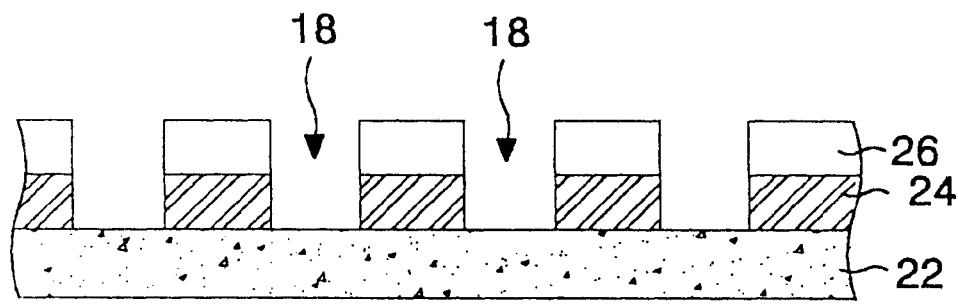
FIG. 5B is a cross-sectional view showing the data pad portion taken along the VB–VB' line of FIG. 4.
Figure 6:
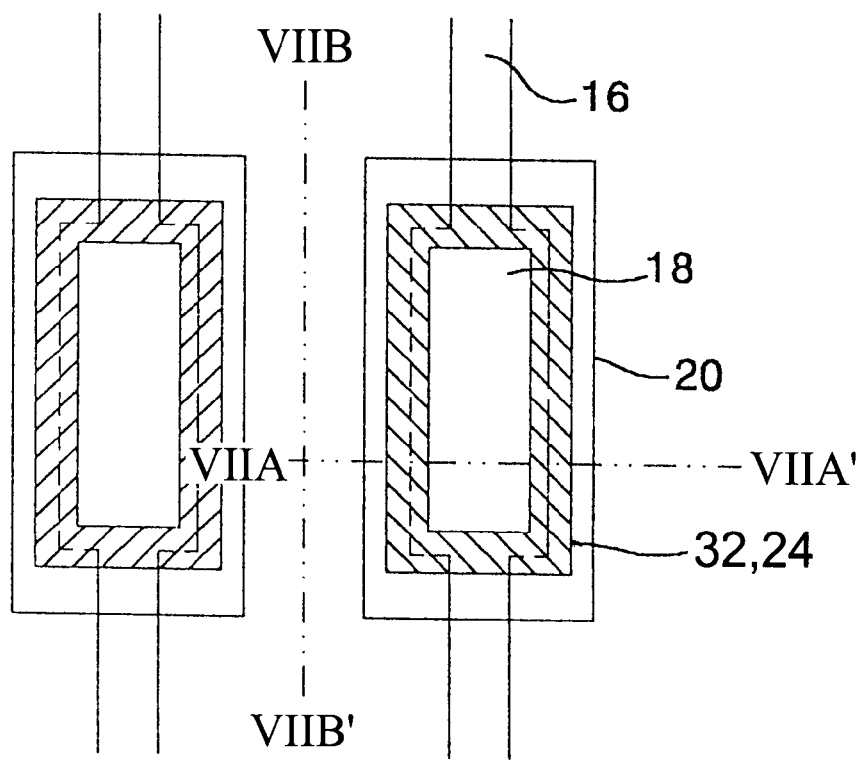
FIG. 6 is a plan view representing in detail a part of gate pad portion included in a LCD according to a preferred embodiment of the present invention.
Figure 7A:
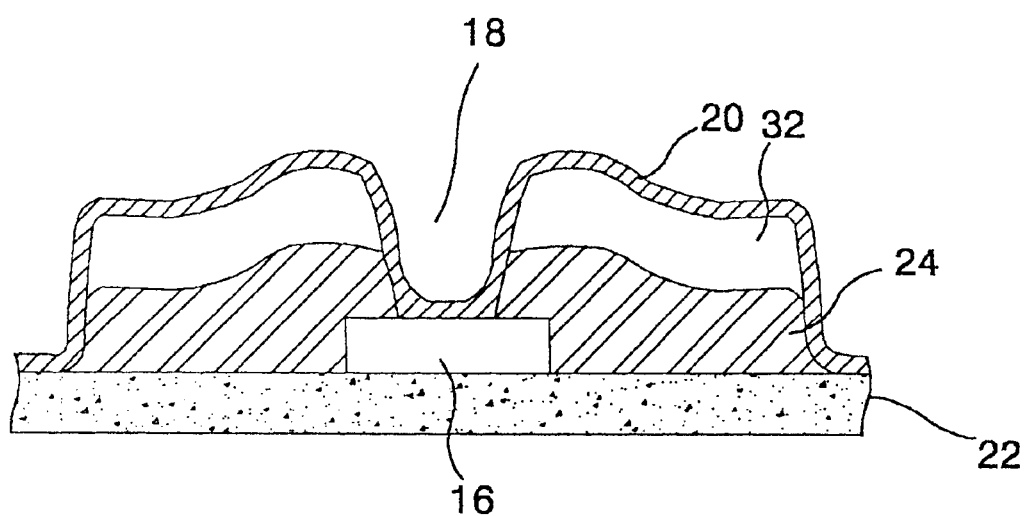
FIG. 7A is a cross-sectional view showing the gate pad portion taken along the VIIA–VIIA' line of FIG. 6.

FIG. 6 is a detailed plan view representing a part of the gate pad portion that is included in an LCD according to a preferred embodiment of the present invention. FIG. 7A is a cross-sectional view showing the gate pad portion taken along the VIIA–VIIA' line of FIG. 6, and FIG. 7B is a cross-sectional view showing the gate pad portion taken along the VIIB–VIIB' line of FIG. 6.

Figure 7B:
FIG. 7B is a cross-sectional view showing the gate pad portion taken along the VIIB–VIIB' line of FIG. 6.

Gate pads 16, as shown in FIGS. 6, 7A, and 7B, are provided on a lower glass substrate 22 together with the gate lines of a display portion (not shown) preferably all at the same time. A gate insulating layer 24 is disposed on the entire surface of the lower glass substrate 22 so as to mount the gate pads 16 thereon. The gate insulating layer 24 is patterned so as to define holes 18 which are positioned at each of the gate pads 16. The holes 18. allow the gate pads 16 to be exposed. Then, a semiconductor pattern 32, preferably made of amorphous silicon, is disposed on the gate insulating layer 24 and around each of the holes 18. The semiconductor pattern 32 preferably has a substantially ring shaped configuration arranged such that an edge of the gate pad 16 is overlapped by the semiconductor pattern 32 and the gate insulating layer 24. Next, an organic protective layer is coated on the entire surface of the gate insulating layer 24 so as to locate the semiconductor pattern 32 thereon. The organic protective layer is then removed from the gate pad portion of the liquid crystal panel via patterning. The gate insulating layer 24 is also patterned via an etching process.

When the gate insulating layer 24 is etched, the semiconductor pattern 32 functions as an etching prevention layer to prevent the undercutting of the gate insulating layer 24. Note that if the width of the semiconductor pattern 32 is too narrow, the gate insulating layer 24 will be undercut at the etched area. If this occurs, the gate pad will be damaged in the TAB process and the transparent electrode that is to be formed after the etching process may be opened due to a step that is created by the semiconductor pattern 32 and the etched gate insulating layer 24. Thus, the width of the semiconductor pattern 32 must be set appropriately to prevent undercutting of the gate insulating layer 24. Finally, the transparent electrode 20 is formed on each semiconductor pattern 32. The transparent electrodes 20 protect the gate pads 16. The gate pad portion with the above-described structure eliminates the need for the organic protective layer and the gate insulating layer 24 around the gate pads 16, and partially exposes the surface of the lower glass substrate 22, as shown in FIG. 7B.

Accordingly, the gate pad portion prevents separation of the transparent electrode 20 due to weak adhesion between the organic protective layer and the gate insulating layer 24 when the TAB process is repeated. Also, an Anisotropic Conductive Film (ACF) (not shown) to bind the TCP to the gate pad portion is in contact directly with the lower glass substrate 22. Thus, the adhesion between the gate pad portion and the TCP remains very strong.

Figure 8:
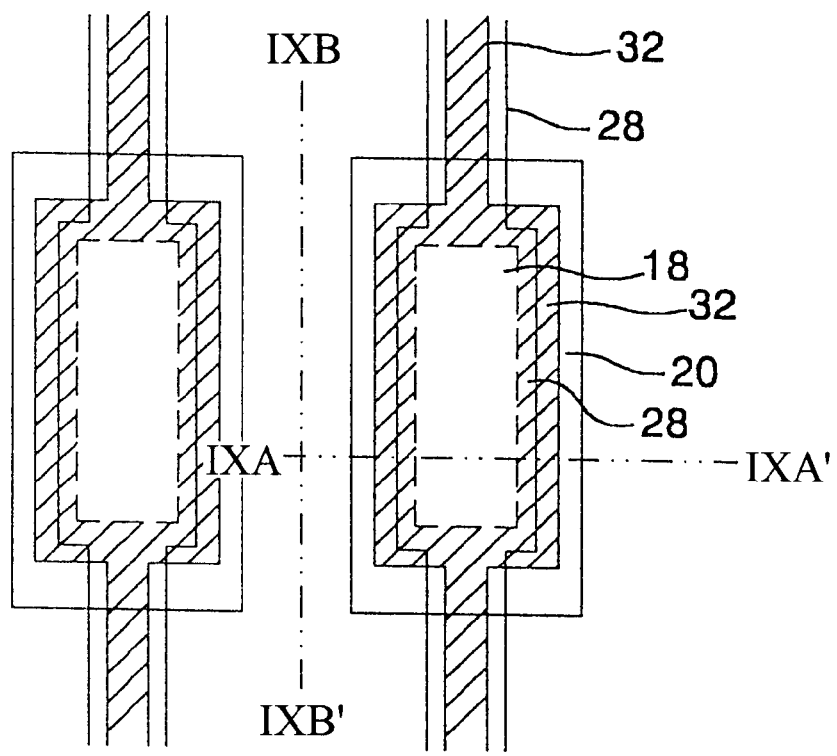
FIG. 8 is a plan view representing in detail a part of data pad portion included in a LCD according to another preferred embodiment of the present invention.
Figure 9A:
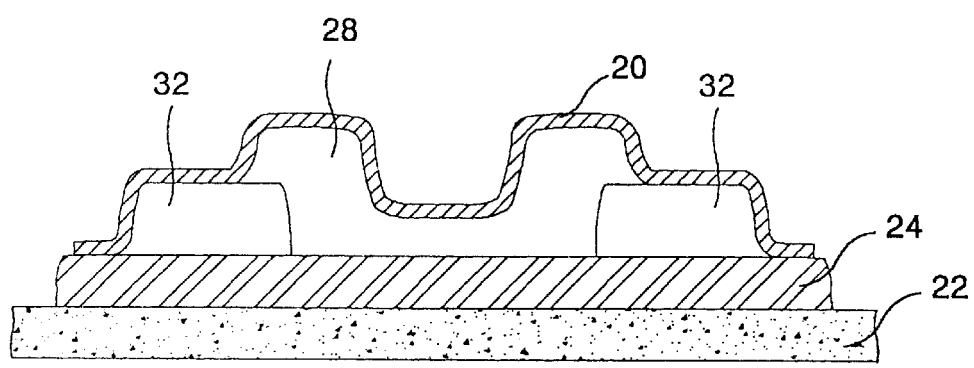
FIG. 9A is a cross-sectional view showing the data pad portion taken along the IXA–IXA' line of FIG. 8.
Figure 9B:
FIG. 9B is a cross-sectional view showing the data pad portion taken along the IXB–IXB' line of FIG. 8.

FIG. 8 is a detailed plan view representing a part of data pad portion that is included in an LCD according to another preferred embodiment of the present invention. FIG. 9A is a cross-sectional view showing the data pad portion taken along the IXA–IXA' line of FIG. 8, and FIG. 9B is a cross-sectional view showing the data pad portion taken along the IXB–IXB' line of FIG. 8. Referring to FIGS. 8, 9A, and 9B, the data pad portion includes a semiconductor pattern 32, preferably made of amorphous silicon, on the gate insulating layer 24 and disposed on the lower glass substrate 22. Each semiconductor pattern 32 preferably has a substantially ring shaped configuration similar to that of the gate pad portion. Also, the semiconductor pattern 32 that is provided on the gate insulating layer 24 extends to the data line (not shown). Consequently, the semiconductor pattern 32 has substantially the same shape as that of the conventional data pad portion. Further, the data pad portion has data pads 28 that are filled at the holes associated with the semiconductor pattern 32 and is also overlapped with the inner circumference of each semiconductor pattern 32. Each data pad 28 is in contact with the gate insulating layer 24 around the hole defined by the semiconductor pattern 32 having the substantially ring shaped configuration. Then, an organic protective layer is disposed on the entire surface of the gate insulating layer 24 that is provided with the semiconductor pattern 32 and the data pads 28. The organic protective layer is patterned so that it is eliminated from the data pad portion.

The gate insulating layer 24 is also patterned by the etching process. When the gate insulating layer 24 is etched, the semiconductor pattern 32 functions as an etching prevention member to prevent the undercutting of the gate insulating layer 24. Consequently, the gate insulating layer 24 remains only under the data pads 28 and the semiconductor patterns 32. Note that if the width of the semiconductor pattern 32 is too narrow, the gate insulating layer 24 will be undercut. If this occurs, the data pad can be damaged by the TAB process, and the transparent electrode that is to be formed after the etching process may become opened due to a step that is caused by the semiconductor pattern 32 and the undercut gate insulating layer 24. Thus, the width of the semiconductor pattern 32 must be set appropriately to prevent undercutting of the gate insulating layer 24. Finally, the transparent electrodes 20 are formed on the semiconductor patterns 32 and the data pads 28. The transparent electrodes 20 protect the data pads 28. The data pad portion with the above-described structure eliminates the need for an organic protective layer and the gate insulating layer 24 that is around the data pads 28, and partially exposes the surface of the lower glass substrate 22, as shown in FIG. 9B.

Accordingly, the data pad portion prevents separation of the transparent electrode 20 due to the weak adhesive force between the organic protective layer and the gate insulating layer 24 when the TAB process is repeated. Also, an ACF (not shown) to bind the TCP to the data pad portion is in contact directly with the surface of the lower glass substrate 22. As a result, the adhesion between the data pad portion and the TCP remains strong.

As described above, preferred embodiments of the present invention eliminate the need for the organic protective layer and the gate insulating layer that is conventionally positioned around the pads. Accordingly, preferred embodiments of the present invention prevent separation of the transparent electrode when the TAB process is repeated. Further, preferred embodiments of the present invention allow for an ACF to bind the TCP to the pad portion and to directly contact the surface of the lower glass substrate 22. As a result, the adhesion between the pad portion and the TCP remains strong. Further, preferred embodiments of the present invention provide a semiconductor pattern around the pad area for preventing the undercutting of the gate insulating layer so that the pads are are not damaged and the transparent electrodes are not opened.

While the invention has been particularly shown and descibed with reference to preferred embodiments thereof, it will be understood by those skilled in the art that the foregoing and oher changes in form and details may be made therein without departing from the spirit and scope of the invention.

What is claimed is:

1. An LCD (liquid crystal display) having a pad portion for contact with a drive integrated circuit, the LCD comprising:

a substrate;

electrode pads on the substrate;

transparent electrodes on the electrode pads; and semiconductor layer patterns disposed between the substrate and the transparent electrodes, and in contact with the transparent electrodes, wherein one of the transparent electrodes that is in contact with one of the semiconductor layer patterns covers entirely said one of the semiconductor layer patterns, and an upper surface of said one of the semiconductor layer patterns contacts said one of the transparent electrodes.

2. The LCD according to claim 1, further comprising an anisotropic conductive film disposed on the substrate.

3. The LCD according to claim 1, further comprising a gate insulating layer disposed on the substrate.

4. The LCD according to claim 3, wherein the semiconductor layer patterns are disposed between the gate insulating layer and the transparent electrodes.

5. The LCD according to claim 3, wherein the semiconductor layer patterns are etch preventing layers for preventing an etching of the gate insulating layer that is substantially beneath the semiconductor layer patterns.

6. The LCD of claim 1, wherein the semiconductor layer patterns are made of amorphous silicon.

7. The LCD according to claim 1, wherein said one of the transparent electrodes and said one of the semiconductor layer patterns are part of a gate pad portion, said one of the semiconductor layer patterns having a substantially ring-shaped configuration.

8. The LCD according to claim 7, wherein a second one of the transparent electrodes is in contact with a second one of the semiconductor layer patterns and is part of a data pad portion, and the second one of the semiconductor layer patterns includes a ring-shaped portion which is entirely covered by said second one of the transparent electrodes.

9. The LCD according to claim 1, wherein the semiconductor layer patterns are absent from an area between the transparent electrodes.

10. An LCD (liquid crystal display) With a pad portion for contact with a drive integrated circuit, the LCD comprising:

a substrate;

a pad area on the substrate and including a plurality of electrode pads on the substrate;

a plurality of transparent electrodes on the electrode pads; and semiconductor layer patterns disposed at the pad area at least partially underneath the electrode pads and in contact with the transparent electrodes, wherein one of the transparent electrodes that is in contact with one of the semiconductor layer patterns covers entirely said one of the semiconductor layer patterns, and an upper surface of said one of the semiconductor layer patterns contacts said one of the transparent electrodes.

11. The LCD according to claim 10, wherein the semiconductor layer patterns are made of amorphous silicon.

12. The LCD according to claim 10, further comprising an anisotropic conductive film disposed on the substrate.

13. The LCD according to claim 10, further comprising a gate insulating layer on the substrate.

14. The LCD according to claim 13, wherein the semiconductor layer patterns are etch preventing layers for arranged to preventing of the gate insulating layer patterns that is substantially beneath the semiconductor layer patterns and the electrode pads.

15. The LCD according to claim 10, wherein said one of the transparent electrodes and said one of the semiconductor layer patterns are part of a gate pad portion, said one of the semiconductor layer patterns having a substantially ring-shaped configuration.

16. The LCD according to claim 15, wherein a second one of the transparent electrodes is in contact with a second one of the semiconductor layer patterns and is part of a data pad portion, and the second one of the semiconductor layer patterns includes a ring-shaped portion which is entirely covered by said second one of the transparent electrodes.

17. The LCD according to claim 10, wherein the semiconductor layer patterns are absent from an area between the transparent electrodes.

18. An LCD (liquid crystal display) having a pad portion for contact with a drive integrated circuit, the LCD comprising:

a glass substrate;

a gate insulating layer on the glass substrate;

electrode pads on the glass substrate;

transparent electrodes on the electrode pads and arranged to protect the electrode pads; and semiconductor layer patterns on the gate insulating layer and arranged to prevent etching of a gate insulating layer that is in contact with the electrode pads, wherein the semiconductor layer patterns are in contact with the transparent electrodes, and one of the transparent electrodes that is in contact with one of the semiconductor layer patterns covers entirely said one of the semiconductor layer patterns and an upper surface of said one of the semiconductor layer patterns. contacts said one of the transparent electrodes.

19. The LCD of claim 18, wherein said one of the semiconductor layer patterns has a substantially ring shaped configuration, and wherein an edge of the corresponding electrode pad is partially overlapped with said one of the semiconductor layer patterns.

20. The LCD of claim 18, wherein the semiconductor layer patterns are amorphous silicon layers.

21. The LCD of claim 20, wherein the amorphous silicon layers are disposed on the gate insulating layer.

22. The LCD of claim 20, wherein said one of the transparent electrodes is disposed on said one of the semiconductor layer patterns and contacts the corresponding electrode pad vias holes provided in the corresponding amorphous silicon layer and the gate insulating layer if said corresponding electrode pad is a gate pad.

23. The LCD of claim 18, wherein a different one of the semiconductor layer patterns is disposed at least partially beneath the corresponding electrode pad if said corresponding electrode pad is a data pad.

24. The LCD of claim 18, wherein said one of the transparent electrodes and said one of the semiconductor layer patterns are part of a gate pad portion, said one of the semiconductor layer patterns having a substantially ring-shaped configuration.

25. The LCD of claim 24, wherein a second one of the transparent electrodes is in contact with a second one of the semiconductor layer patterns and is part of a data pad portion, and the second one of the semiconductor layer patterns includes a ring-shaped portion which is entirely covered by said second one of the transparent electrodes.

26. The LCD according to claim 18, wherein the semiconductor layer patterns are absent from an area between the transparent electrodes.

27. A method for manufacturing an LCD (liquid crystal display) having a pad portion for contact with a drive integrated circuit, the method comprising the steps of:

provide a glass substrate;

forming gate pads on the glass substrate;

overlaying a gate insulating layer on the entire surface of the glass substrate and forming holes exposing the gate pads by patterning the gate insulating layer;

forming data pads on the gate insulating layer;

disposing semiconductor layer patterns on the gate insulating layer to provide first ones of the semiconductor layer patterns at least partially beneath the data pads and to provide second ones of the semiconductor layer patterns at least partially overlapped with the gate pads; and forming transparent electrodes on the data and gate pads for protecting the data and gate pads, wherein one of the transparent electrodes is in contact with and covers entirely one of the semiconductor layer patterns.

28. The method of claim 27, wherein the step of disposing the semiconductor layer patterns includes forming each of the semiconductor layer patterns to have a substantially ring shaped portion that is arranged to allow an edge of any one of the data and gate pads to be partially overlapped with the corresponding semiconductor layer pattern.

29. The method of claim 27, wherein said one of the transparent electrodes and said one of the semiconductor layer patterns are part of a gate pad portion, said one of the semiconductor layer patterns having a substantially ring-shaped configuration.

30. The method of claim 29, wherein a second one of the transparent electrodes is in contact with a second one of the semiconductor layer patterns and is part of a data pad portion, and the second one of the semiconductor layer patterns includes a ring-shaped portion which is entirely covered by said second one of the transparent electrodes.

31. The method according to claim 27, wherein the semiconductor layer patterns are absent from an area between the transparent electrodes.

32. A method of forming pad portions in a display device for contact with a drive integrated circuit of the display device, the method comprising the steps of:

forming a gate pad portion on a substrate at a peripheral portion of a display panel part of the display device; and forming a data pad portion on the substrate at the peripheral portion of the display panel part, wherein the step of forming the gate pad portion includes the steps of, forming a gate pad on the substrate, forming sequentially a first gate insulating layer and a first semiconductor layer pattern on the substrate and over portions of the gate pad so as to define a contact hole therethrough, and covering entirely the first semiconductor layer pattern, the first gate insulating layer and the contact hole with a first transparent electrode layer so that the first transparent electrode layer contacts the first semiconductor layer pattern.

33. The method of claim 32, wherein the step of forming the data pad portion includes the steps of:

forming a second gate insulating layer on the substrate, forming a second semiconductor layer pattern on the second gate insulating layer, forming a data pad on the second gate insulating layer and over portions of the second semiconductor layer pattern, and covering entirely the second semiconductor layer pattern and the data pad with a second transparent electrode layer.

34. The method of claim 33, wherein the first semiconductor layer pattern is in a substantially ring-shaped configuration and the second semiconductor layer pattern includes a substantially ring-shaped portion.

35. The method of claim 34, wherein the second transparent electrode layer is in contact with the second semiconductor layer pattern.

36. The method according to claim 32, wherein the step performing the gate pad portion further includes the steps of:

forming another gate pad on the substrate;

forming another gate insulating layer and another semiconductor layer pattern over portions of said another gate pad so as to define another contact hole therethrough; and covering entirely said another semiconductor layer pattern, said another gate insulating layer and said another contact hole with another transparent electrode layer so that said another transparent electrode layer contacts said another semiconductor layer pattern, wherein said semiconductor layer patterns and said gate insulating layers are absent from an area between said first transparent electrode and said another transparent electrode.

* * * * *